H. E. ROBERTSON.
LOCK NUT FOR COUPLINGS.
APPLICATION FILED APR. 14, 1916, RENEWED MAR. 27, 1919.
1,305,009.
Patented May 27, 1919.
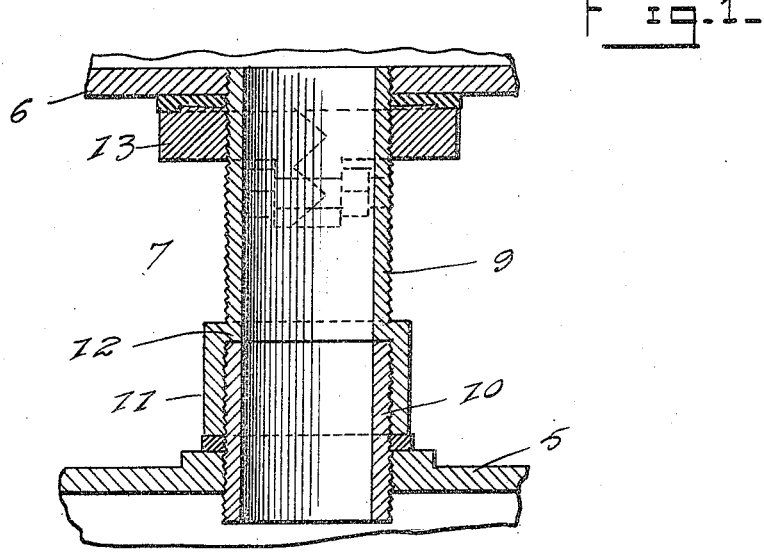
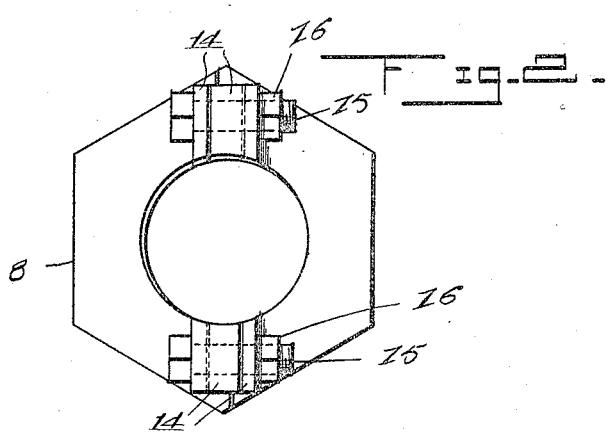
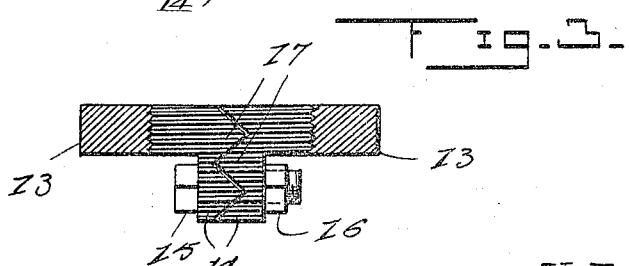
Inventor
H. E. Robertson.
Witness

UNITED STATES PATENT OFFICE.

HARRY E. ROBERTSON, OF WILMINGTON, NORTH CAROLINA.

LOCK-NUT FOR COUPLINGS.

1,305,009.  Specification of Letters Patent.  Patented May 27, 1919.

Application filed April 14, 1916, Serial No. 91,128. Renewed March 27, 1919. Serial No. 285,653.

*To all whom it may concern:*

Be it known that I, HARRY E. ROBERTSON, a citizen of the United States, residing at Wilmington, in the county of New Hanover and State of North Carolina, have invented certain new and useful Improvements in Lock-Nuts for Couplings; and I do hereby declare the following to be a full, clear, and exact description of the invention, such as will enable others skilled in the art to which it appertains to make and use the same.

This invention has for its object to provide a quick detachable and sectional lock nut primarily designed for locking the couplings between the boiler sections and header of a steam boiler, whereby the lock nut and coupling may be quickly and conveniently detached to facilitate the removal of the section of the boiler.

With this and other objects in view, the invention consists in the novel construction, combination and arrangement of parts as will be hereinafter specifically described, claimed and illustrated in the accompanying drawing, in which:

Figure 1 represents a fragmentary detail sectional view through the coupling, fragments of a boiler section and header and the improved nut lock, Fig. 2 represents a bottom plan of the nut removed, and Fig. 3 represents a transverse sectional view through the nut.

Referring to the drawing in detail, wherein similar reference numerals designate corresponding parts throughout the several views, the numerals 5 and 6 indicate fragments of a boiler section and header, respectively, which are connected by the coupling, designated generally by the numeral 7. The coupling 7 is secured in adjusted position with relation to the boiler section and header by a lock nut, designated generally by the numeral 8.

The coupling 7 includes two sections 9 and 10, the section 10 being of tubular formation and formed from end to end with external screw threads which are fitted in an internally screw threaded opening ordinarily provided in the boiler section 5. The end of the section 9 adjacent the section 10 is enlarged, as indicated at 11, and formed with internal screw threads receiving the adjacent terminal of the section 10. The shoulder 12, provided at the point of enlargement of the section 9, constitutes a stop for the section 10 and a seat for an annular gasket. The end of the section 9 opposite the header is formed with external screw threads, which fit in the opening ordinarily provided in the header 6 directly over the boiler section 5.

The lock nut 8 is fitted upon the externally screw threaded end of the section 9 and is engaged with the lower surface of the header 6. The nut is composed of two substantially semicircular sections 13, which are formed at their opposite ends with laterally projecting and apertured ears 14, receiving bolts 15 carrying nuts 16, whereby the sections are detachably connected. The adjacent ends of the sections 13 are formed with interfitting teeth or projections 17, which are designed to insure accurate alinement of the internal screw threads of the nuts when assembled.

In use, when it is desired to remove the header section 5 from the boiler, the bolts 15 are removed, thus permitting the sections 13 of the lock nut to be disengaged from the header 6 and coupling member or section 9 and the latter is subsequently rotated so as to enter the header 6 and disengage the section 10 from the boiler section 5. The section 10 is subsequently removed from the section 9 and the header 5 may be then removed from the boiler.

What is claimed is:

A coupling comprising two interfitting externally threaded sections, a sectional nut fitted upon one of said sections, downwardly extending lugs formed on the meeting edges of the nut sections, means for detachably and adjustably connecting the lugs, said lugs having their inner faces threaded to engage the threaded portions of the sections.

In testimony whereof I affix my signature in presence of two witnesses.

HARRY E. ROBERTSON.

Witnesses:
JNO. W. GAFFORD,
WALKER TAYLOR.

Copies of this patent may be obtained for five cents each, by addressing the "Commissioner of Patents, Washington, D. C."